July 21, 1931.  B. B. JOHNSON  1,815,569
COOKING VESSEL
Filed Dec. 31, 1929
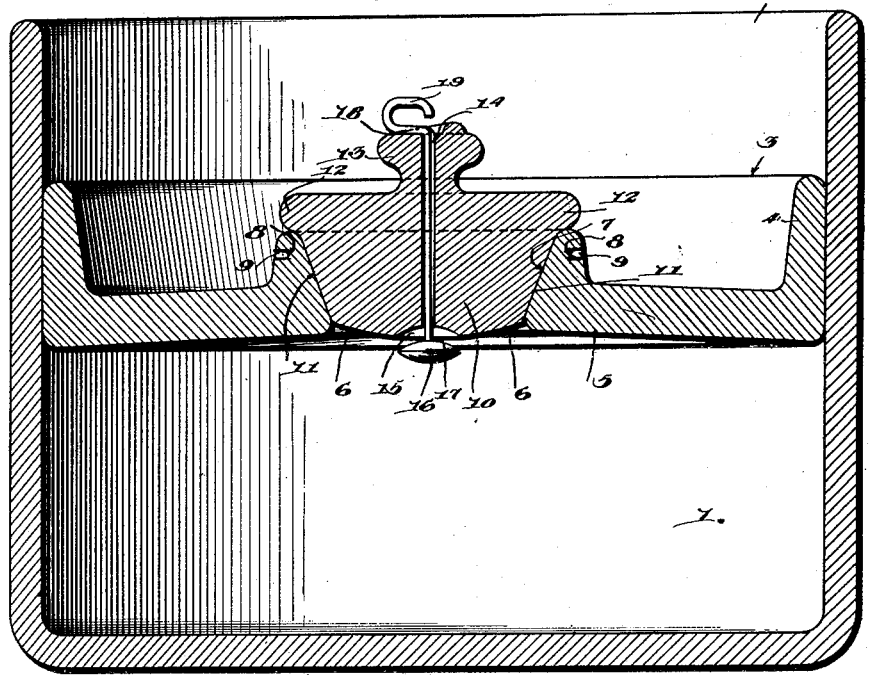
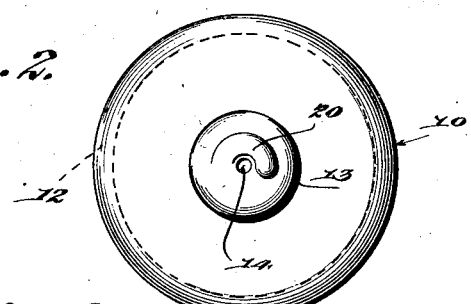
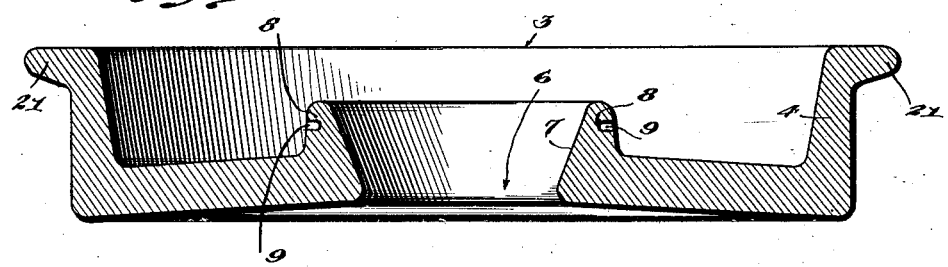
WITNESS
INVENTOR
Bruce B. Johnson,
BY
ATTORNEY Patented July 21, 1931

1,815,569

UNITED STATES PATENT OFFICE

BRUCE B. JOHNSON, OF LONG BEACH, CALIFORNIA

COOKING VESSEL

Application filed December 31, 1929. Serial No. 417,741.

This invention relates to cooking vessels, and is more particularly concerned with a vessel for this purpose having means for substantially restricting and practically preventing oxidation, through the heat of cooking, of the vessel contents, thereby conserving the natural flavor and food value of edibles.

It is recognized by modern authorities on this subject that a large portion of the food value of an edible is lost through the oxidation which occurs in the methods of cooking as heretofore practised; and that the food value of the natural mineral salts, vitamins, etc. have heretofore been lost through the oxidation which occurs when the edible is subjected to cooking heat and is exposed to atmospheric air. It has been proposed to overcome these disadvantages by slow cooking in a closed container under relatively low heat, i. e., below the boiling point of water. As heretofore proposed and practised, however, substantial oxidation has not been prevented with the result that the natural food values of edibles have been destroyed.

It is the object of my invention to provide a cooking vessel in which the oxidizable edible is confined within a closed area from which oxidating air is expelled; in which the closed area automatically conforms at all times to the area occupied by the edible; in which entrance of the oxidating air into the closed cooking area may be prevented during the cooking process and permitted, as desired, thereafter; and to provide such results through means of a simple inexpensive nature embodying specific structural features of substantial advantage.

The invention consists in the structural features, arrangements and combinations of parts as hereinafter described and claimed and will be more clearly apparent from the following detailed specification which is to be read in conjunction with the accompanying drawings forming part thereof and in which:—

Figure 1 is a vertical sectional view of a cooking vessel embodying the improvements of the present invention.

Figure 2 is a top plan view of the valve plug for the follower cover, removed, showing the locking cam incline for the upper end of the valve stem.

Figure 3 is a transverse vertical section of the follower cover showing the tapered seat for the valve plug and a modified form of edge flange.

Preferably, a vessel 1 is used having relatively thick walls permitting slow cooking under relatively low heat, and an open top 2 whose internal diameter coincides with that of the body of the vessel.

In accordance with my invention, I have provided a follower cover, generically designated 3, having an external diameter or contour conforming to that of the interior side walls of the vessel so as closely to fit these side walls. This cover, as shown in Figure 1 is provided with an upstanding edge flange 4 of coincident external diameter or contour to closely fit the side walls of the vessel with the added advantage of maintaining the cover centered within the vessel and permitting uniform downward movement thereof by gravity to engage and rest upon the contents of the vessel. This flange also will prevent the jamming of the cover against the side walls of the vessel by preventing tilting of the cover and consequent jamming through requiring its initial insertion in the vessel top with its sides in a vertical plane.

The bottom face 5 of the cover is tapered or convexed, curving or tapering inwardly and upwardly from its outer edges to the edges of the lower end of a central vertically extending air escape opening 6 which edges are in a plane above the plane of the outer edges of the bottom face. The wall 7 bordering this central opening tapers outwardly and upwardly forming a tapered or inclined seat for a valve plug hereinafter described, the top of the base of the cover bordering this opening having a boss 8 formed thereon, providing for an upward prolongation of the tapered plug seat 7 with the outer wall of the boss providing a hand grip for removing the follower cover from the vessel. Sockets 9 may be formed in the external walls of the boss to receive hooks of a suitable lifting bail, if desired.

The convexed under face of the follower cover in conjunction with the central relatively elevated air escape opening has the function of guiding the surplus air compressed by the "follower" action of the cover as it descends upon the edible substance in the vessel, inwardly to the central escape opening 6 so that trapping of air in the vessel between its bottom, side walls and the cover is obviated.

The follower cover, with the air escape passage 6 unobstructed is inserted in the vessel after the material to be cooked has been placed therein and slides downwardly by gravity to impinge the material, and where, the nature of the edible permits, at least partially to compact it in the bottom of the vessel. The air above the cover will be expelled out through the opening 6 as it descends and the bottom face of the cover will adjust itself to the surface of the edible material. When this has taken place substantially all surplus air below the cover will have been expelled.

The opening 6 is now closed by a valve plug 10 having tapered outer side walls 11 conforming to the side walls 7 of the opening 6 and having the top of its main body formed with an edge bead or flange 12 designed to seat on the upper edge of the boss 8, closing the top of opening 6 and also preventing the insertion of the plug to the point where it will be jammed against the walls 7 and prevent removal when expanded through heat. The tapered sides 11 of the plug are designed to have a friction tight fit with the tapered seat 7 without jamming.

The plug 10 is also provided centrally of its top with an upward protuberance or knob 13 through which an air vent bore 14 extends vertically downward centrally of the plug to its base which as shown, is convexed and is provided at the lower end of the bore 14, with a concentric concaved valve seat 15. A valve disk 16 having a cooperating upper face convexed closely to fit the concavity of seat 15, is supported at the lower end of a rod 17 of less diameter than the bore 14. This rod extends upwardly through and beyond the upper end of the vent bore and is provided with a lateral offset 18 resting on the top face of the knob 13, and with a finger extension 19 thereabove. The top face of the knob, as shown in Figures 1 and 2, is provided with an annular ridge 20 concentric with bore 14 and having its top face on an incline and underlying the lateral offset 18. By axially turning the lateral offset through its finger piece 19, it may be caused to ride up or down over the inclined ridge 20, bringing the upper convexed face of the valve disk 16 up into the concave valve seat 15 to close the lower end of the vent bore 14 or to lower the valve disk and open said bore and admit air into the space below the cover.

The rod 17 is thus actuated to close the lower end of the bore after the follower cover has been inserted and has seated over the material to be cooked with the surplus air expelled and the plug 10 applied. It will prevent the entry of air within the cooking chamber during the cooking process and may be operated to open the bore 14 at the completion of the cooking to break any vacuum that may have formed within the closed cooking area and prevent the removal of the plug and cover. The sides of the latter closely fitted to the sides of the cooking vessel with edge flanges 4 of substantial extent, will practically seal the top of the cooking area at its side edges from ingress of oxidating air thereto, aided by the pressure action of heat expansion within said area.

I do not maintain that with a follower cover of the described form and type, absolutely all oxidizing air is excluded from the cooking area for a small and what may be termed residual quantity is necessarily present, but it will be evident that with the follower cover and valved plug of the present invention, or its equivalent forms, the edible material will be enclosed within a closed cooking area from which all surplus oxidizing air has been expelled and into which other air is controllably prevented from entering during the cooking process.

The follower cover and its plug valve and the cooking vessel with which it cooperates may be made of any and various substances suitable for the intended purpose and I do not desire to be restricted either in respect to material or its thickness or shape except as specifically stated in the claims and subject, of course, to the qualification that the diameter or side edge contour of the follower cover is to be substantially coincident with the internal diameter or contour of the vessel in which it is to be fitted and that the weight of the follower cover is sufficient and proportioned to its gravitational follower action.

It is to be noted that the follower cover shown in Figure 3 corresponds in all essential particulars with the form shown in Figure 1 but is modified by the provision of a beading or flange 21 which is intended to overlie and seat upon the top edge of a vessel in which the cover is inserted, this flanged edge type of cover being suitable for use in relatively shallow cooking vessels, its top edge flange preventing injurious compacting pressure of the cover on the vessel contents.

While the particular structural form of the invention illustrated represents a simplified form and preferable embodiment of the invention, it is intended as illustrative only of the invention and not as restrictive thereof and is subject to modification in adapting the invention to different conditions of manufacture and use in consonance with the spirit of the invention and the scope of the appended claims.

What I claim, therefore, and desire to secure by Letters Patent is:

1. A gravitating follower cover for cooking vessels comprising a disk like member having an air escape opening therethrough with a bossed extension on its upper face, said opening having upwardly and outwardly inclined walls, and a closure plug for said air escape opening having a body portion tapered in coincidence with said wall inclines for frictional engagement therewith, and having a surmounting flange positioned to seat upon the top of said bossed extension.

2. A gravitating follower cover for cooking vessels comprising a disk like member having an upwardly and outwardly tapering air escape passage extending vertically therethrough with a surmounting boss on the upper face of the disk member, and a closure plug for said passage comprising a body portion of coincident taper seating in and closing said passage, a surmounting edge flange seating over said boss at the upper end of said passage, with an air vent bore extending vertically through said plug edged by a valve seat at its lower end, a valve below said seat, and a supporting member therefor extending upwardly through said vent bore and operable to move said valve to open and close, respectively, the lower end of said vent bore.

BRUCE B. JOHNSON.